United States Patent [19]

Hall, Sr.

[11] 3,807,654

[45] Apr. 30, 1974

[54] MAGNETIC TAPE RECORDING DECK, DRIVE SYSTEM, AND CASSETTE

[75] Inventor: Robert P. Hall, Sr., Auburn, Calif.

[73] Assignee: Arvin Industries, Inc., Columbus, Ind.

[22] Filed: Apr. 24, 1972

[21] Appl. No.: 246,812

[52] U.S. Cl. .................. 242/199, 242/206, 274/4 C

[51] Int. Cl. .... G03b 1/04, G11b 15/32, G11b 23/04

[58] Field of Search ............................ 242/197–206, 242/186, 185; 226/95–97; 318/6, 7; 274/4 D, 4 C, 11 D, 11 C

[56] References Cited

UNITED STATES PATENTS

| | | | |
|---|---|---|---|
| 3,302,900 | 2/1967 | Messamer | 242/185 |
| 3,148,816 | 9/1964 | Martin et al. | 226/95 |
| 2,867,389 | 1/1959 | Viets | 242/198 |
| 2,989,261 | 6/1961 | Gillette et al. | 242/199 |

*Primary Examiner*—Leonard D. Christian

*Attorney, Agent, or Firm*—Biebel, French & Bugg

[57] ABSTRACT

A magnetic tape recording system with capstan drive uses counteracting takeup and supply motors which are controlled in response to the power demand of a capstan drive motor. No pinch roll or shoe is needed to keep proper tape contact with the capstan, driving of the tape being achieved with a tensioned loop formed partially around the capstan. A cassette is also provided with radially toothed clutch drives to the supply and takeup motors.

10 Claims, 5 Drawing Figures

MAGNETIC TAPE RECORDING DECK, DRIVE SYSTEM, AND CASSETTE

CROSS-REFERENCE TO RELATED APPLICATIONS

This application is related to copending applications Ser. No. 246,635 and Ser. No. 246,636, both filed on the same date as this application and assigned to the same assignee.

BACKGROUND OF THE INVENTION

This invention relates to a magnetic tape deck and a corresponding cartridge system for use with the deck, for the purpose of magnetic recording and replay. The best known commercial magnetic tape handling systems employing a cassette or cartridge for the tape are the so-called Norelco cassettes, such as shown in U.S. Pat. No. 3,394,899, and the eight track cartridge system, such as shown in U.S. Pat. Nos. 3,478,973 and 3,482,792. In either of these systems the motive power to move the tape is supplied by a capstan cooperating with a pinch roll to nip the tape therebetween and move it forward past a magnetic transducer at a desired constant speed. The tape is then taken up on a takeup device which operates through a slip clutch, or in some other comparable fashion, to gather the tape in a roll after it passes the transducer and capstan.

In devices designed to operate with the cassette of the type shown in U.S. Pat. No. 3,394,899, it is customary to provide for a movement of the magnetic transducer toward and away from the cassette in order to bring the transducer into and out of contact with the tape. The capstan in those devices inserts through an aperture in the cassette behind the tape, and a pinch roll moves with the transducer, pushing the tape into engagement with the capstan as the transducer is brought forward to its operative position. Where more than one channel of operation is provided, and especially where the tape has different tracks when running in different directions, it is necessary either to have a mounting of the transducer which is off center with respect to the longitudinal center of the tape, or else to provide for movement of the transducer transverse to the path of the tape through the face of the cassette.

In the so-called endless tape cartridge such as shown in U.S. Pat. No. 3,482,792, the pinch roller is incorporated as a part of the cassette or cartridge, and the entire cartridge is moved forward against the transducer and the pinch roll, with the transducer entering an opening in one end of the cassette, against the pinch roll. To follow different tracks on the tape, a transducer is provided with mechanisms which move it transversely of the tape to align with different tracks on the tape.

In either of these systems, the takeup of the tape, and the resistance supplied by the supply roll, is merely kept sufficient to prevent tangling or jamming of the tape, and this is accomplished with various forms of friction drive clutches or mechanisms. These are subject to wear and require adjustment or replacement from time to time, and constitute a source of mechanical repair and maintenance difficulty. Furthermore, they operate independently of the capstan drive, merely assuring that the tape is freely supplied and the takeup continues to gather the tape passing from the capstan and transducer, to avoid jams and tangling.

SUMMARY OF THE INVENTION

The present invention provides a deck and a cooperating magnetic tape cassette which is of simplified mechanical construction and arrangement, which utilizes electrical and electronic controls to provide the necessary tape tension and constant feed. In accordance with the invention, separate drive motors are provided for the capstan, for the takeup roll, and for the supply roll. A capstan is mounted in such a way that a cooperating cassette can be moved partially around the capstan to guide the tape over the face of a transducer mounted near the capstan, and to cause the tape to wrap around a portion of the capstan face, for example in the order of 60° to 90° of the cylindrical capstan surface. The speed of the capstan drive motor is sensed by a tachometer which in turn feeds a signal to an electronic servo control. The servo control provides a variable D.C. power output to the takeup motor and the supply motor, such that a predetermined tension is maintained in the tape to hold the tape properly in contact with the aforementioned segment of the capstan surface. This allows the capstan to maintain complete control over tape speed in the region of the transducer, without the need for a pinch roll or backup shoe, or some equivalent device.

The reel servo is separate from the capstan servo except in that its controlling signal is capstan current. The reel servo operates to control the supply and takeup motor currents in such a fashion as to require zero work of the capstan. The static tension level is established by setting appropriate quiescent currents to the supply and takeup motors.

Continuous traction between tape and capstan surface is guaranteed by the static tape tension and by the establishment of a zero work requirement at the capstan. Zero work, of course, implies balanced tape tension into and out of the capstan.

The capstan servo is simply a velocity servo with tachometer feedback. The capstan motor is preferably of the type which has a permanent magnet field, and is current driven, such that its output is independent of back E.M.F. and brush friction.

In turn, this arrangement allows the use of a simplified cassette and deck, having only an optimum number of parts. The takeup and supply rolls constitute hubs mounted in the cassette body, together with the necessary passage space for the tape, and a pair of spaced guide rolls are provided near corners of the cassette. These form a tape path which extends past an opening in the face of the cassette which is arranged to receive the capstan, the transducer, and a small flanged guide roller which maintains alignment of the tape with the transducer for proper tracking of the tape over the transducer face. In a preferred embodiment the cassette is symmetrical in construction, and there are side openings on either side of its center to accommodate the capstan shaft, whereby the cassette can be inserted in either of two positions, in either case with the capstan, transducer, and flanged guide rollers extending partially into the front edge of the cassette.

Accordingly, the primary object of this invention is to provide a novel deck and cassette arrangement for the handling of magnetic recording tape and the like, using a simplified fixed mounting of the transducer, the drive capstan and an alignment guide device such as a flanged roller for aligning the tape in the cassette with the transducer, and wherein separate drives are provided for the capstan and for each of the takeup and supply hubs of the cassette, whereby the capstan speed can be sensed and closely regulated, and whereby the supply and takeup drives can also be closely regulated to maintain predetermined tension in the tape guided around a portion of the capstan surface, thus eliminating the need for pinch rolls or other backup mechanism to keep the tape in contact with the capstan for the proper friction drive of the tape; and to provide a novel and relatively inexpensive mounting arrangement for the cassette within the deck whereby the drive connections for the takeup and supply motors may readily be made to the hubs of the appropriate supply and takeup rolls within the cassette.

Other objects and advantages of this invention will be apparent from the following description, the accompanying drawings and the appended claims.

DESCRIPTION OF THE PREFERRED EMBODIMENT

Figures 1, 2:
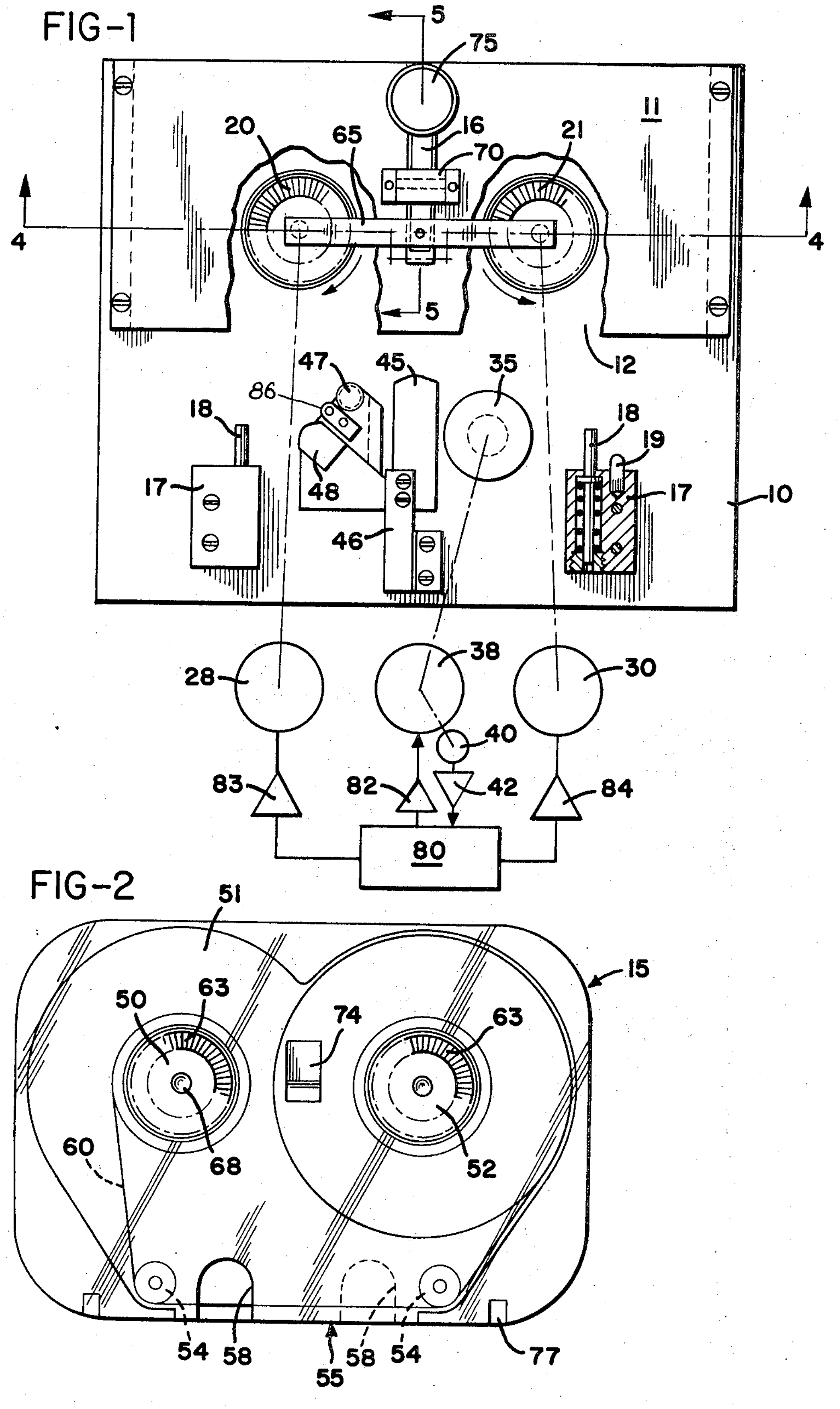
FIG. 1 is a plan view of the deck with some parts broken away, together with a schematic showing of the drive and control system.
FIG. 2 is a plan view of the cassette.

Referring to FIG. 1, which shows the general arrangement of the deck, a base 10 is provided with walls 11 forming a generally rectangular cavity 2 of sufficient depth to receive the cassette 15, which is shown in FIG. 2. A spring loaded positioning arm 16 engages the cassette and holds it against stops 17 at the front edge of the cavity. The stops incorporate spring loaded ejector pins 18, and an alignment pin 19 in one of the stops. In the bottom of the cavity are the faces of toothed drive clutch members which are indicated generally at 20 and 21. The members 20 and 21 (see also FIG. 4) comprise a disc with a plurality of radially oriented ridges or teeth 22 projecting upwardly and angularly from its surface. In one successful embodiment each tooth had one face extending upward from the disc at about 90°, and the other tooth face extending from the disc at about a 60° angle, with the vertical face intended to transmit driving torque. It is also possible to utilize undercut teeth as disclosed in copending application, Ser. No. 246,636 filed Apr. 24, 1972 which is assigned to the assignee of this application. Disc 20 is fastened to a supply roll drive spindle 24, and similarly disc 21 is fastened to a takeup roll drive spindle 26.

As shown schematically in FIG. 1, these spindles extend to separate electric motors, namely the supply motor 28 and the takeup motor 30. These motors preferably are low voltage D.C. torque motors of the type having a permanent magnet field and a printed circuit form of rotor. The direction of rotation of each of these motors is such as to produce the desired rotation of the drive discs 20 and 21, respectively.

A cylindrical capstan 35 is mounted on a drive shaft 36 extending through base 10, and which in turn is driven by a motor 38 of the same general construction as the motors 28 and 30. Driven with the capstan is a tachometer 40 which provides a speed sensing means with an appropriate electrical output through amplifier 42. Adjacent to the capstan 35 is a magnetic transducer head 45 over which the tape is quided. Preferably this head is mounted in fixed position as shown, upon a bracket 46, which also carries a flanged alignment guide roller 47. The head 45 may include one or more magnetic transducer assemblies, depending upon whether the unit is to operate with one or more tracks on the tape. Also, a secondary transducer 48 may be mounted on bracket 46.

Figure 3:
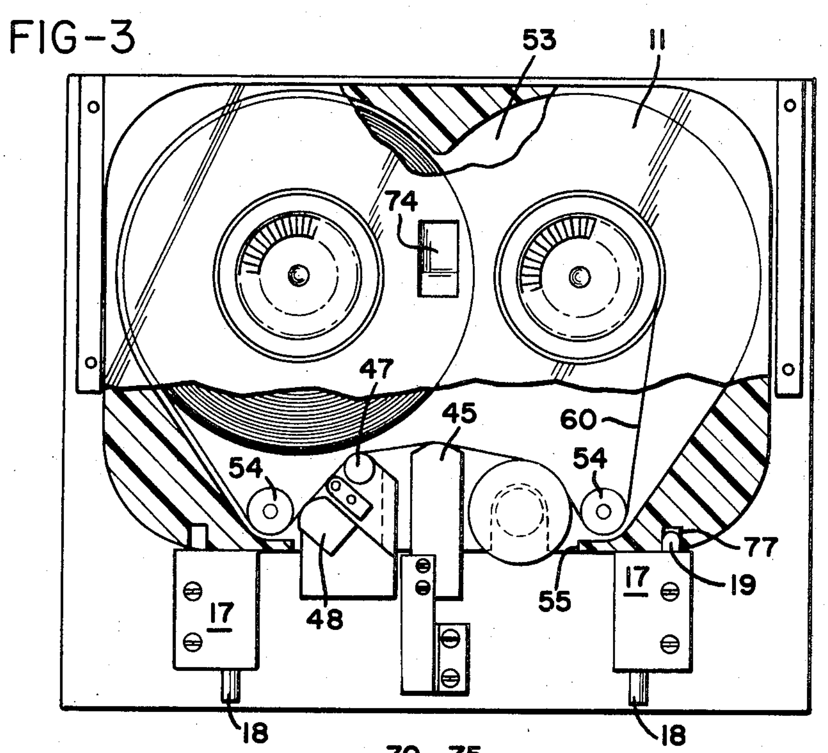
FIG. 3 is a segmental view of the deck with the cassette in operative position, illustrating the tape path cross the transducers and around a portion of the capstan surface, with the cassette holding mechanism removed.

Referring to FIG. 2, the cassette housing 15 has transparent walls 51 and provides a mounting for a symmetrical arrangement of tape carrying and guiding equipment. For purposes of explanation the hub 50 is considered the supply hub, and the hub 52 is considered the takeup hub, each of these being suitably rotatably mounted in the housing. At the front of the cavity 53 (FIG. 3) within the cassette housing are cylindrical guide rollers 54. In the front edge of the housing 15, between the rollers 54, there is an opening which is indicated generally by the reference numeral 55, and which opens into cavity 53 to receive the assemblage of the capstan 35, the transducer 45, and the alignment roller 47 within the front edge of the cassette. There are appropriate openings 58 in the top and bottom of the cassette housing in order to pass the capstan shaft 36. The remainder of the capstan, transducer and alignment roller preferably enter the front edge of the cassette housing through opening 55, generally as shown in FIG. 3, with either of its walls 51 upward.

The tape 60 is fastened at its opposite ends to the hubs 50 and 52. When the cassette is in place in the deck, the tape path is as shown in FIG. 3, with the tape in its normal feeding mode passing around rollers 54, between the flanges of the alignment roller 47, across the face of transducers 45 and 48, and through a partial loop around the surface of the capstan 35. It will be noted from FIG. 3 that there is a substantial surface-to-surface contact between the tape 60 and the capstan 35, over an arc of between 60° and 90°. This extended surface-to-surface contact between the tape and the capstan, together with the controls to be explained, provide for friction driving of the tape by the capstan, without the need of a backup plate, pinch rolls, or other such mechanism to pinch a segment of the tape against the capstan surface.

The top and bottom of the hubs 50 and 52 are provided with radially oriented ridges or teeth 63 (FIGS. 2 and 4) which correspond to teeth 22 of drive members 20 and 21, to provide a simple form of clutch. Should there be some force in the opposite direction, the hubs can overrun the teeth in the drive discs.

This clutch connection between the supply and takeup spindles and the corresponding supply and takeup hubs within the cassette provides a simple positive toothed drive without the need for interengaging shafts, keys, or the like. This arrangement also simplifies the manner in which the cassette can be placed and held within the cavity of the deck.

Figure 4:
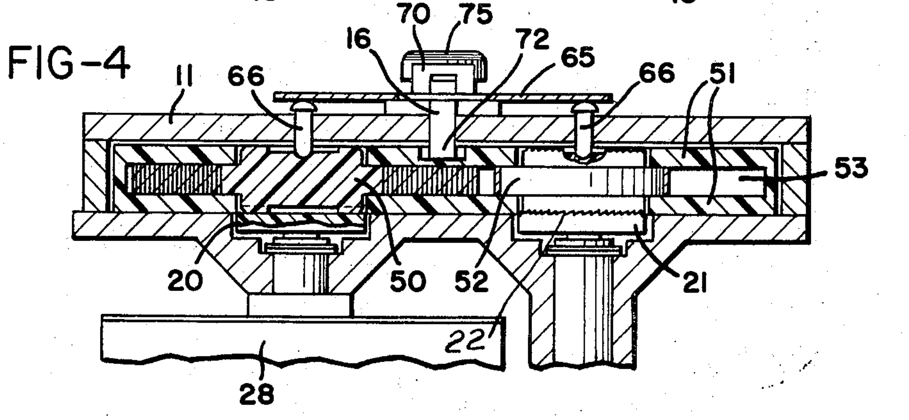
FIG. 4 is a cross-section view taken on line 4—4 in FIG. 1.
Figure 5:
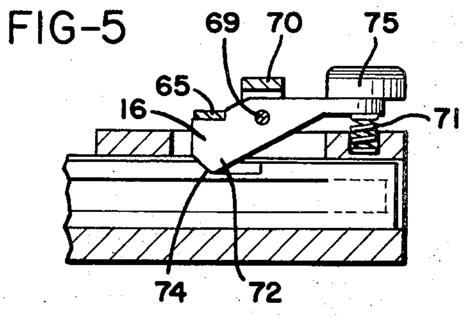
FIG. 5 is a partial cross-sectional view taken through the cassette retainer arm.

As shown in FIGS. 1, 4 and 5, the holddown arm 16 carries a leaf spring 65 which presses on pins 66 which are slidably mounted in the wall 11 to align with dimples 68 in the cassette hubs 50 and 52. Arm 16 is pivoted on a pin 69 carried in a short bracket 70 on top of wall 11. A spring 71 urges the cam end 72 of arm 16 into a retaining slot 74 in either wall 51 of the cassette, and a plate 75 provides a surface for tilting arm 16 against spring 71 to lift cam 72 out of the cassette slot. This also releases the pressure of leaf spring 65 on the pins 66 and hubs 50 and 52.

In operation the cassette is inserted into the cavity formed by walls 11, against the spring loaded pins 18, until the locator pin 19 engages a hole 77 in the cassette and lever 16 drops into slot 74. As this happens spring 65 presses the pins 66 into the hubs of the cassette, to insure engagement of the driven and driving teeth 63 and 22. When the lever 16 is manually moved, as by pressing plate 75, the pins 18 will eject the cassette partially from the cavity, to the point where it can be grasped and removed.

The drive control is illustrated schematically in FIG. 1. In general, it incorporates an electronic servo speed control 80 which provides an output to a control amplifier 82 driving the motor 38 for the capstan drive. Feedback from the tachometer through the amplifier 42 provides the necessary closed loop to maintain capstan speed at some predetermined constant. The servo system also senses the amount of current required to maintain capstan motor speed at the desired constant, and provides appropriate control signals to an amplifier 83 which controls the supply motor 28, and an amplifier 84 which controls the takeup motor 30. The arrangement is such that for any given power requirement of the capstan motor, there is a corresponding resistance power requirement for the supply motor 28, which opposes the supply of tape through the capstan, and there is a corresponding power requirement for the takeup motor 30 in order not only to take the tape away from the capstan, but also to maintain the tape loop in contact with the capstan surface. The balance between the action of these two motors maintains a predetermined tension in the tape, particularly in that region of the partial loop of tape in contact with the capstan, thus maintaining sufficient contact force to assure a constant frictional drive between the capstan and the tape without the use of pinch rollers or equivalent mechanisms. This drive system is applicable to other decks not employing a cassette for tape handling.

The system provided by the invention thus affords accurate control of tape tension and speed, for high quality recording and reproduction, using a simplified deck and cassette construction. The cassette is easily inserted and removed with a simple unidirectional motion. The cassette and the deck are easily manufactured, and the cassette in particular requires little precision construction although it gives precise operating results.

In a typical system successfully used, high quality recording was achieved on ten tracks (each direction) using a one-fourth inch wide tape, with about 4,500 feet of 1 mil tape in a cassette, operating at 12 inches per second. Transducer 48 was employed as an erase head, transducer 45 was a ten unit or ten channel record/playback head, and member 86 functioned as a detector for the ends of the tape.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a tape handling system
a supply roll,
a takeup roll,
a capstan having a peripheral tape driving surface,
a transducer,
a capstan drive motor connected to rotate said capstan to move tape past said transducer,
a takeup motor connected to rotate said takeup roll in a direction to pull tape from said capstan,
a supply motor connected to rotate said supply roll in a direction to withhold tape from said capstan,
means sensing the speed of said capstan, and
speed control means responsive to said speed sensing means to maintain a predetermined speed of said capstan drive motor; the improvement comprising
means forming a loop of tape passing said transducer and contacting a substantial extent of the capstan surface,
and tension control means responsive to the drive power supplied to said capstan drive motor and connected to control the opposing power outputs of said takeup motor and said supply motor to maintain tension in the loop of tape.

2. A system as defined in claim 1, wherein said supply and takeup rolls are mounted on hubs in a cassette and include clutch members at the exterior of said cassette,
a quantity of tape fixed at opposite ends to said rolls and transferrable therebetween,
an access opening at one edge of said cassette to receive at least a part of said capstan surface into said cassette,
guide means guiding the tape between said rolls and forming a free span of tape across said access opening, the span of tape between said guide means being spaced sufficiently from said rolls to allow the tape within said cassette to loop partially around said capstan under the influence of said loop forming means,
and complementary clutch members driven from said supply and takeup motors and mounted to engage said clutch members on said cassette when said cassette is operatively positioned relative to said capstan.

3. A system as defined in claim 2 wherein all of said clutch members have a driving face construction including circumferentially arranged radially extending tapered teeth.

4. A system as defined in claim 3, wherein there are clutch members on each end of each hub accessible from opposite sides of said cassette.

5. A tape handling system comprising
wall means defining a cassette receiving cavity having opposed parallel surfaces forming a top and bottom for said cavity and side surfaces for guiding a rectangular relatively thin cassette along a single path into an operative position within said cavity,
stop means defining the inner limit of movement of a cassette into said cavity and thus defining the operative position of the cassette, a pair of spaced apart power drive clutch members mounted flush in one of said surfaces and facing into said cavity allowing the cassette to slide over said clutch members in moving along said path, retainer means engageable with a cassette for holding it in said cavity against said stop means, and a capstan rotatably mounted in a fixed position with a peripheral surface of said capstan dimensioned to fit at least partly through an edge of the cassette whereby a portion of said capstan surface extends into a cassette properly located in said cavity.

6. A system as defined in claim 5, including biasing means operable by said retainer means to urge the hub portions of a cassette toward said clutch members.

7. A tape handling system comprising a supply roll drive spindle, a takeup roll drive spindle spaced from said drive spindle, a capstan spaced from both said spindles, a transducer adjacent to said capstan, a capstan drive motor connected to rotate said capstan to move tape past said transducer, separate supply and takeup drives operative to rotate said spindles simultaneously in opposite directions to pull tape against said capstan, a cassette having an internal cavity and an access opening into said cavity through an edge of the cassette and dimensioned to fit around at least a portion of said capstan and said transducer, spaced apart hub members in said cassette, clutch members rotatably mounted flush with the exterior of said cassette connected to said hub members, a quantity of recording tape on said hub members for movement therebetween during rotation of said hub members, means defining a cassette receiving cavity including guiding walls operating to position the cassette with said capstan and transducer into said access opening, complementary drive clutch members on said spindles and located flush with said guiding walls and spaced to align with and to contact said clutch members of said cassette when the cassette is positioned in the receiving cavity, and means responsive to correct positioning of said cassette in said cassette receiving cavity to urge said clutch members into firm driving engagement.

8. In a magnetic tape recorder utilizing recording tape contained in a tape cassette having driven hubs for supply and take-up of the tape, the improvement comprising:

tape drive means including a deck having a tape drive capstan and a pair of spaced apart drive hubs in predetermined spaced relationship to accommodate said driven hubs of said cassette, a first motor connected to drive said capstan, second and third motors connected to drive respective ones of said drive hubs in opposition to each other, means for guiding said cassette and the recording tape therein into engagement with said capstan, said guiding means including means for forming a length of said recording tape into a loop and placing a portion of said loop into driving engagement with said capstan, means for sensing the power required to drive said first motor when said recording tape is in engagement with said tape drive capstan;

means for providing a signal indicative of such power requirement; and automatically operable control means connected to said signal providing means and operative to control tape tension in response to said signal by controlling the outputs of said second and third motors.

9. In apparatus utilizing an information recording tape wound into a coil on a hub, the improvement comprising:

means for advancing said recording tape from said coil including a capstan for engaging and moving said recording tape and a takeup hub receiving the tape, means coupled to said tape for maintaining substantially constant tape tension during transfer of the tape onto the takeup hub, means defining a loop-like tape advance path, means for locating said capstan within the loop of said tape advance path, guide means for forming tape from said coil directly into a loop and for placing a portion of said loop around part of the periphery of said capstan; and a servo system responsive to the power required to maintain said capstan at a constant speed and connected to said tape tension means to maintain a constant tension in the loop of tape.

10. Tape recording apparatus including a recording tape extending between first and second hubs mounted in a cassette having flat sides and an opening in one of its edges, and guide means supporting a free span of tape across said opening;

means for advancing said recording tape including a capstan having a tape driving peripheral surface dimensioned to fit at least partially into said cassette for moving said recording tape, means for moving said span of recording tape from its initial position adjacent said opening into engagement with said capstan, said moving means including means for forming a length of said recording tape into a loop within said cassette and placing a portion of said loop into driving engagement with said surface of said capstan, means coupled to said hubs for tensioning said loop into tight engagement with said capstan, said loop tensioning means including first drive means for rotating one of said hubs and second drive means for oppositely rotating the other said hub, means for driving said capstan including a servo control maintaining the capstan at a constant speed, control means sensing the power required to drive said capstan in moving said tape whereby a reduction in power requirement will indicate too little tension in the tape contacting said capstan, and said control means having outputs regulating said first and second drive means to control tape tension as a function of the power needed to maintain constant capstan speed.

* * * * *